US011288000B2

(12) United States Patent
Anchi et al.

(10) Patent No.: US 11,288,000 B2
(45) Date of Patent: Mar. 29, 2022

(54) DATA MIGRATION IN HETEROGENEOUS STORAGE ENVIRONMENT

(71) Applicant: EMC IP Holding Company LLC, Hopkinton, MA (US)

(72) Inventors: Amit Pundalik Anchi, Bangalore (IN); Srinivas Kangyampeta, Bangalore (IN); Santoshkumar Konnur, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/926,918

(22) Filed: Jul. 13, 2020

(65) Prior Publication Data
US 2021/0373791 A1  Dec. 2, 2021

(30) Foreign Application Priority Data
May 29, 2020 (IN) .............................. 202031022619

(51) Int. Cl.
*G06F 3/06* (2006.01)
*G06F 9/455* (2018.01)

(52) U.S. Cl.
CPC .......... *G06F 3/0647* (2013.01); *G06F 3/0604* (2013.01); *G06F 3/0664* (2013.01);
(Continued)

(58) Field of Classification Search
CPC .... G06F 3/0604; G06F 3/0647; G06F 3/0664; G06F 3/0983; G06F 9/45558;
(Continued)

(56) References Cited

U.S. PATENT DOCUMENTS 9,201,606 B1 *  12/2015  Taylor .................... G06F 3/0661
2016/0092119 A1 *  3/2016  Butterworth .......... G06F 16/119
                                                                711/165
(Continued)

OTHER PUBLICATIONS

EMC Solution Enabler Symmetrix Migration CLI v7.5. Product Guide [online]. Cited pages. EMC Corporation, 2012 [retrieved on Jun. 17, 2021], Retrieved from the Internet:<URL: delltechnologies. com>.( (Year: 2012).*

*Primary Examiner* — Eric T Oberly
(74) *Attorney, Agent, or Firm* — Muirhead and Saturnelli, LLC

(57) ABSTRACT

Transferring data for a virtual machine from a source storage device to a destination storage device includes determining if either the source storage device or the destination storage device is capable of unilaterally transferring data to a storage device having only input and output capabilities. The source storage device pushes data to the destination storage device if the source storage device is capable of unilaterally transferring data to a storage device having only input and output capabilities. The destination storage device pulls data from the source storage device if the destination storage device is capable of unilaterally transferring data to a storage device having only input and output capabilities. A host computing device transfers data from the source storage device to the destination storage device in response to neither storage device being capable of unilaterally transferring data to a storage device having only input and output capabilities.

18 Claims, 5 Drawing Sheets

(52) U.S. Cl.
CPC ........ *G06F 3/0683* (2013.01); *G06F 9/45558* (2013.01); *G06F 2009/4557* (2013.01); *G06F 2009/45579* (2013.01); *G06F 2009/45583* (2013.01)

(58) Field of Classification Search
CPC ... G06F 2009/4557; G06F 2009/45579; G06F 2009/45583
See application file for complete search history.

(56) References Cited

U.S. PATENT DOCUMENTS

2018/0004558 A1\* 1/2018 Das Sharma ....... G06F 13/1663
2018/0124210 A1\* 5/2018 Mosko ................. H04L 67/327

\* cited by examiner

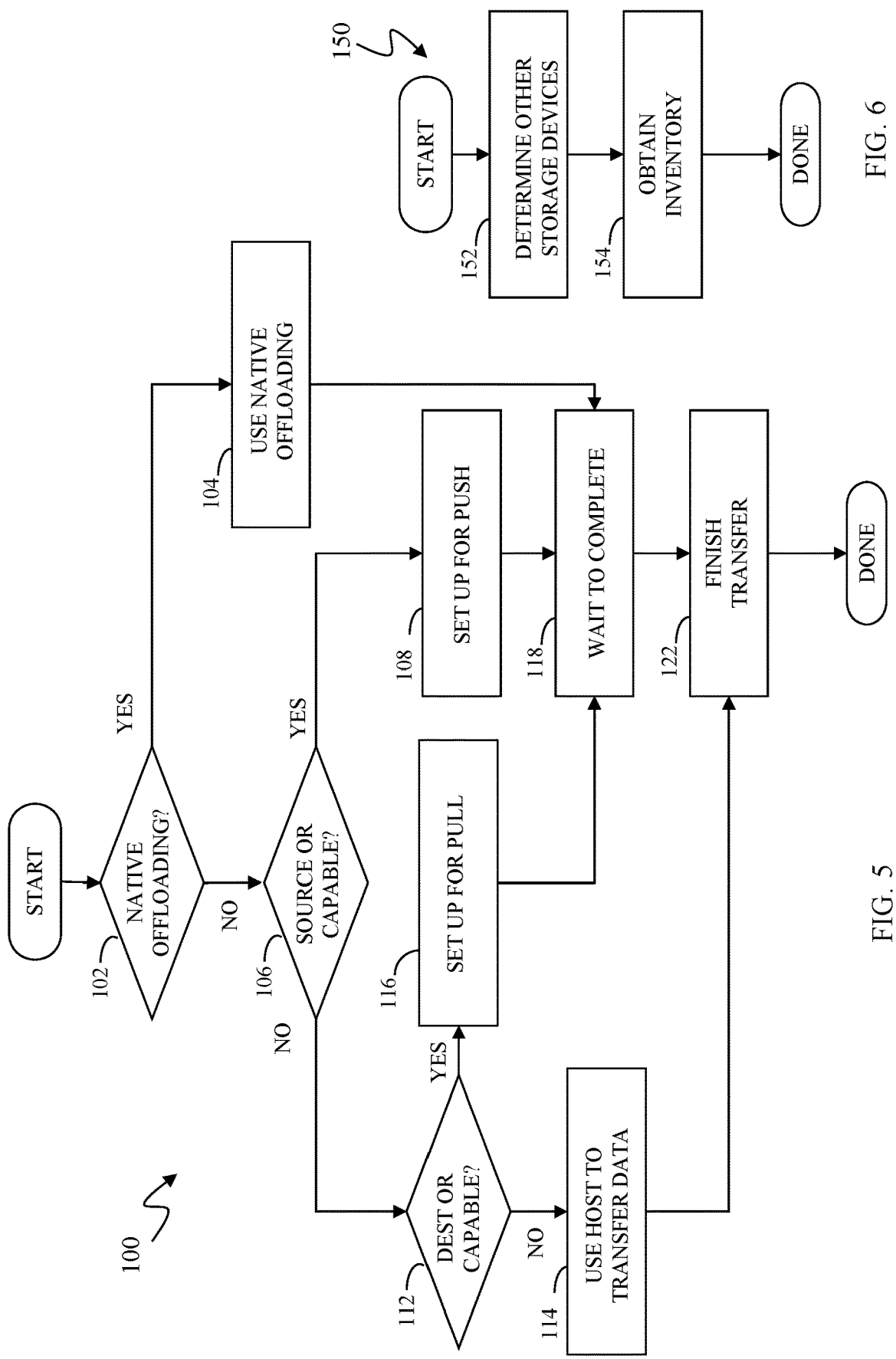

DATA MIGRATION IN HETEROGENEOUS STORAGE ENVIRONMENT

TECHNICAL FIELD

This application relates to the field of computer systems and storage systems therefor and, more particularly, to the field of migrating data between storage systems.

BACKGROUND OF THE INVENTION

Virtualization allows creation of software-based representations of physical computing devices, such as servers. Each of the software-based representations is a virtual machine (VM) that is logically separated from other virtual machines and runs its own operating system. Thus, for example, a first VM may run a first operating system and a second VM on the same physical computing device may run a second operating system different from the first operating system. Note that the number of VMs that may run at the same time on a physical computing device may be limited only by the resources of the physical computing device, such as memory.

Each VM requires storage for the VM image in the same way that a physical computing device, such as a laptop, needs non-volatile storage (e.g., a disk drive) for the operating system, programs, data, etc. In relatively small systems, a single host device could provide all the computing and storage resources for all VMs that are used. However, larger systems may have separate physical hosts and physical storage devices so that the hosts provide compute resources to run the VMs that are stored on the physical storage devices. In some cases, the physical storage devices may be provided by array storage systems, such as the Dell EMC PowerMax array storage device.

In a large operation with many virtual machines, it is useful to be able to move the virtual machines between different hosts and different physical storage devices to provide load balancing and facilitate disaster recovery, among other things. Virtual machine functionality often also includes a mechanism for moving virtual machines between different hosts and different physical storage devices. For example, VMWare, Inc. of Palo Alto, Calif. provides VMotion, which can move a VM between hosts and/or physical storage devices while the VM is running. Once a VMotion operation has been initiated, data for the VM is copied to a destination. At the end, the source VM is suspended/stopped, remaining data is copied, and the VM is started at the destination. The source VM may then be deleted/removed as part of the VMotion process.

A drawback to operations like VMotion is that sometimes additional processing resources of the host may be used to copy the VM data from the source to the destination. This has been addressed this by providing VVols for storage of VM resources. A VVol (virtual volume) is a virtualization of SAN and/or NAS physical storage so that the host does not need to be aware of the physical storage but, instead, accesses the VVol, which uses a VVol framework to deliver storage functionality to the host. An advantage of VVol is that copying operations, including copying data in connection with a VMotion operation, may be off-loaded from the host to the physical storage device, such as a Dell EMC PowerMax storage system. So, for example, a VMotion operation to move a VM from a first host that uses a first physical storage device to a second host that uses a second, different, storage device may take advantage of VVol functionality so that copying data is performed directly by the storage devices without using significant computing resources of the hosts.

Currently, some of the features of using VVols, including offloading copying to the physical storage devices, may not be realized when the physical storage devices are heterogenous (i.e., are provided by different manufactures or, in some cases, are different models). This is because the features may require significant programming and configuration coordination for the physical storage devices, which may not be possible for a third party proprietary array storage system. Thus, for example, a VMotion operation moving a VM from a Dell EMC Powermax storage array to a third party storage array may require the host to read all of the data from the Dell EMC Powermax and then write all of the data to the third party storage array. Having the host perform the copy operation uses significant host processing resources.

Accordingly, it is desirable move virtual machines between different physical storage devices in a way that offloads copying data from the host even in instances where the source and destination physical storage devices are heterogenous.

SUMMARY OF THE INVENTION

According to the system described herein, transferring data for a virtual machine from a source storage device to a destination storage device includes determining if either the source storage device or the destination storage device is capable of unilaterally transferring data to a storage device having only input and output capabilities, the source storage device pushing data to the destination storage device in response to the source storage device being capable of unilaterally transferring data to a storage device having only input and output capabilities, the destination storage device pulling data from the source storage device in response to the destination storage device being capable of unilaterally transferring data to a storage device having only input and output capabilities, and a host computing device, coupled to the source storage device and the destination storage device, transferring data from the source storage device to the destination storage device in response to neither the source storage device nor the destination storage device being capable of unilaterally transferring data to a storage device having only input and output capabilities. At least one of the source storage device or the destination storage device may run open replicator software. The host may be the same host that runs the virtual machine being transferred. A first host may run the virtual machine at the source storage device and a second, different, host may run the virtual machine at the destination storage device. The storage devices may be coupled to a storage area network. The host may be coupled to the storage area network. The virtual machine may access the storage devices using a VVol mechanism. At least one of the devices may be incapable of using native built-in VVol data copying to offload data copying operations to the storage devices. The host may perform unrelated processing while data is being copied from the source storage device to the destination storage device. The unrelated processing may include processing for other virtual machines.

According further to the system described herein, a non-transitory computer readable medium contains software that transfers data for a virtual machine from a source storage device to a destination storage device. The software includes executable code that determines if either the source storage device or the destination storage device is capable of unilaterally transferring data to a storage device having only input and output capabilities, executable code that causes the source storage device to push data to the destination storage device in response to the source storage device being capable of unilaterally transferring data to a storage device having only input and output capabilities, executable code that causes the destination storage device to pull data from the source storage device in response to the destination storage device being capable of unilaterally transferring data to a storage device having only input and output capabilities, and executable code that causes a host computing device, coupled to the source storage device and the destination storage device, to transfer data from the source storage device to the destination storage device in response to neither the source storage device nor the destination storage device being capable of unilaterally transferring data to a storage device having only input and output capabilities. At least one of the source storage device or the destination storage device may run open replicator software. The host may be the same host that runs the virtual machine being transferred. A first host may run the virtual machine at the source storage device and a second, different, host may run the virtual machine at the destination storage device. The storage devices may be coupled to a storage area network. The host may be coupled to the storage area network. The virtual machine may access the storage devices using a VVol mechanism. At least one of the devices may be incapable of using native built-in VVol data copying to offload data copying operations to the storage devices. The host may perform unrelated processing while data is being copied from the source storage device to the destination storage device. The unrelated processing may include processing for other virtual machines.

BRIEF DESCRIPTION OF THE DRAWINGS

Embodiments of the system are described with reference to the several figures of the drawings, noted as follows.

FIG. 5 is a flow diagram illustrating processing performed in connection with using a storage device to copy VM data according to embodiments of the system described herein.

FIG. 6 is a flow diagram illustrating processing performed in connection with initializing using a storage device for copying VM data according to embodiments of the system described herein.

DETAILED DESCRIPTION OF VARIOUS EMBODIMENTS

The system described herein uses software on a storage device to copy data for a virtual machine from one storage device to another even when the storage devices are heterogeneous and one of the storage devices is only capable of performing conventional I/O operations.

Figure 1:
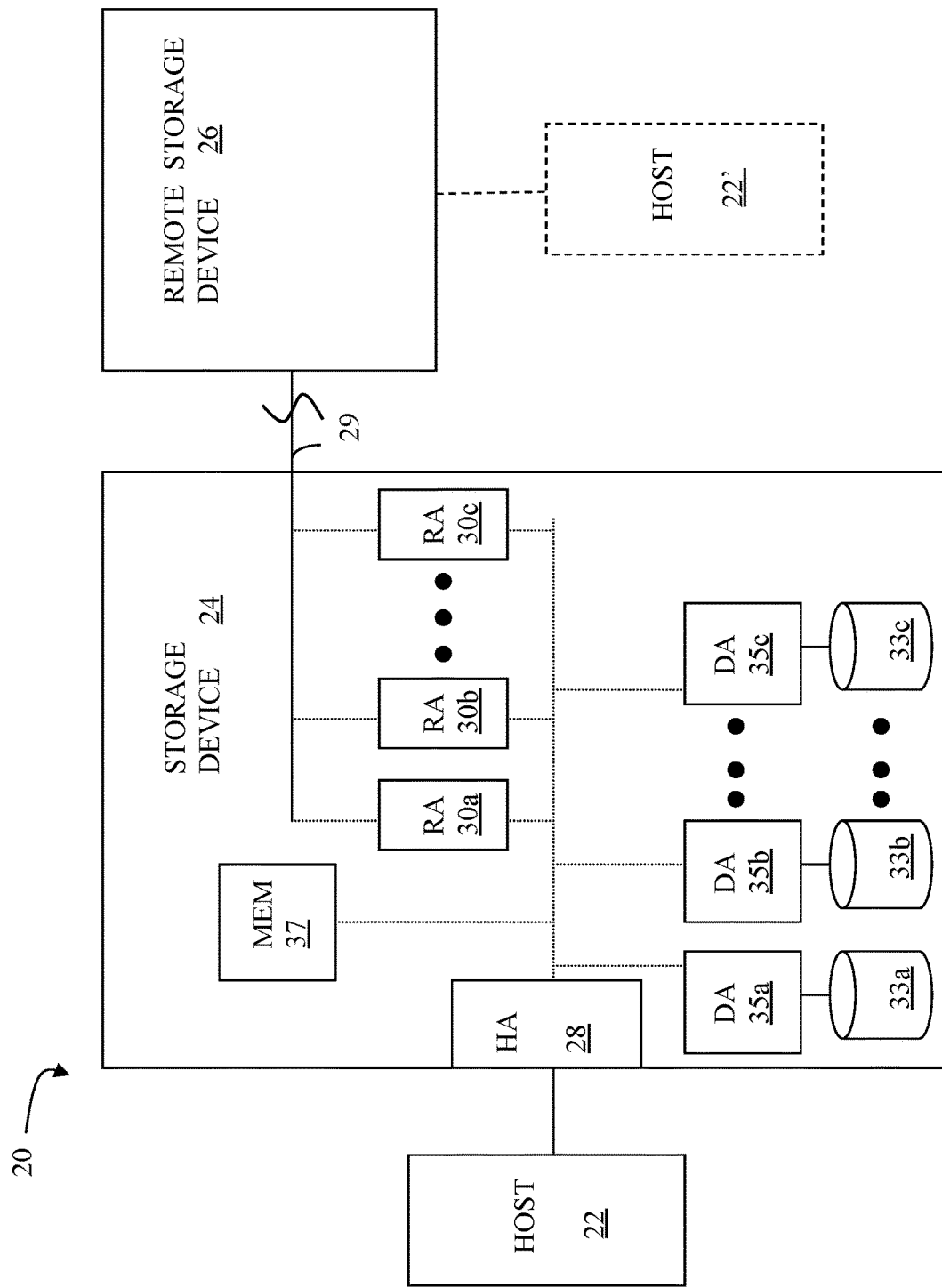
FIG. 1 is a schematic illustration of a storage system showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage systems, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
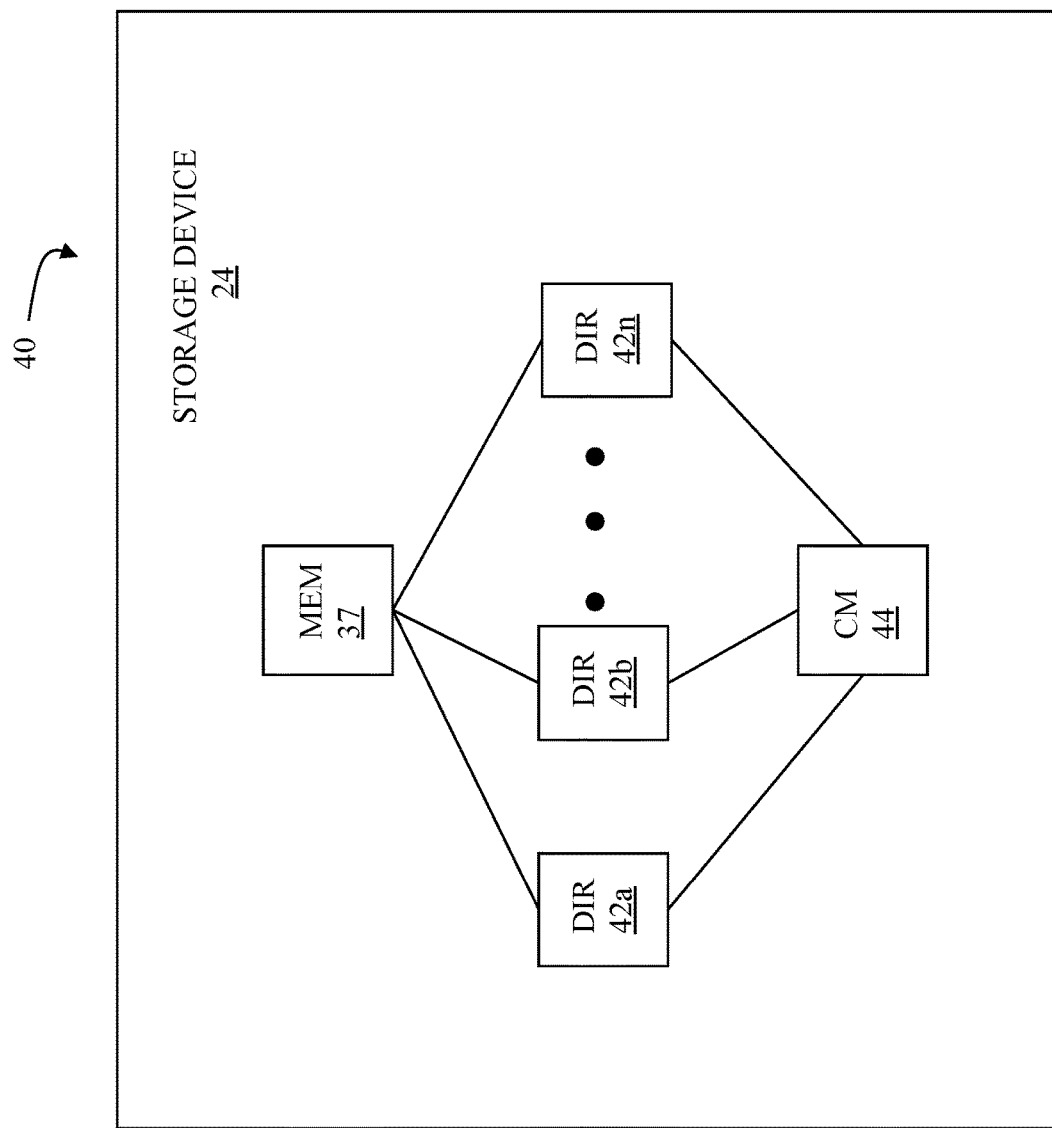
FIG. 2 is a schematic diagram illustrating an embodiment of a storage system where each of a plurality of directors are coupled to a memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
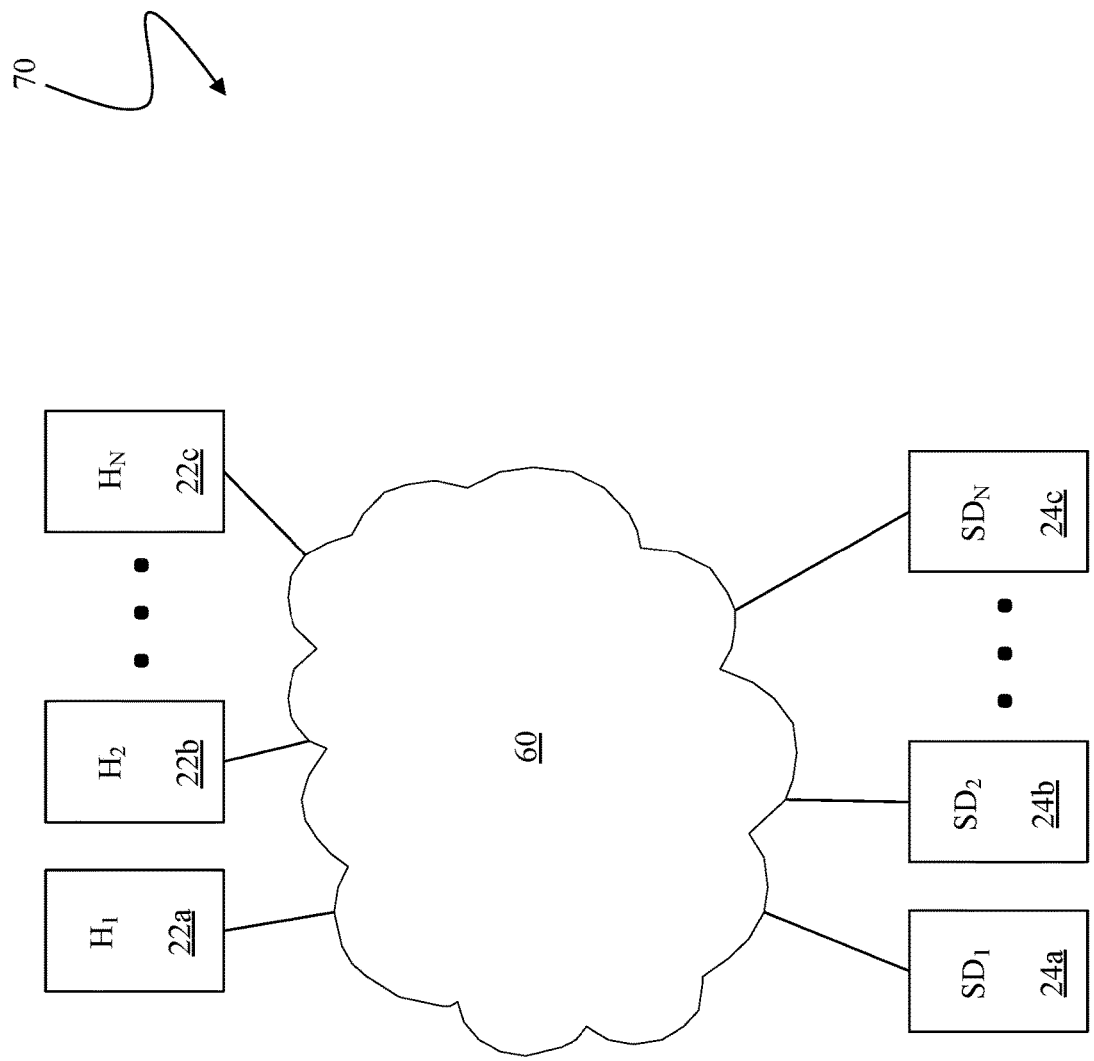
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

Figure 4:
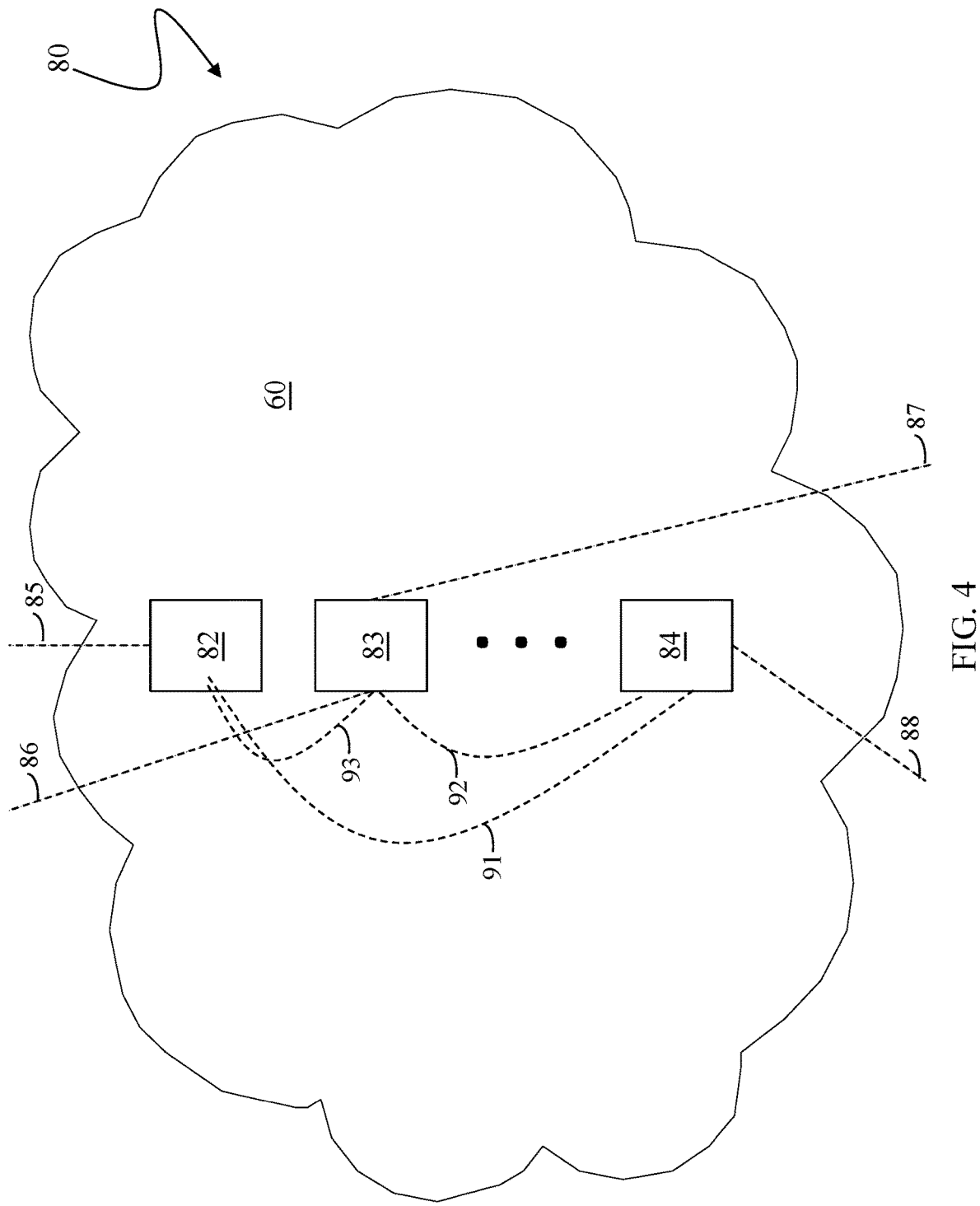
FIG. 4 is a schematic illustration showing in more detail a SAN that may be used in connection with an embodiment of the system described herein.

Referring to FIG. 4, a schematic illustration 80 shows the SAN 60 in more detail as including a plurality of switches 82-84. The SAN 60 may also have a plurality of external connections 85-88 that are provided by the switches 82-84 where some of the external connections 85, 86 may each be coupled to a host system (not shown in FIG. 4) and other external connections 87, 88 may each be coupled to a storage system (not shown in FIG. 4). The SAN 60 also include internal connections 91-93 between the switches. Note that, although three switches 82-84 are shown in the schematic illustration 80, the SAN may have any number of switches, some of which may not be directly coupled to all of the other switches. Generally, a data path through the switches 82-84 exists between a host system (initiator) and a storage system (target) that is accessed by the host system. The system described herein determines an optimal path through the switches 82-84 that minimizes latency of the SAN 60. The optimal path may be determined in connection with reconfiguring the system (e.g., adding or removing one or more switches, host systems, and/or storage systems) or in connection with system rebalancing, possibly in light of a suspected change in access patterns by one or more of the host systems.

Referring to FIG. 5, a flow diagram 100 illustrates processing performed in connection with transferring a virtual machine (VM) from one storage device to another according to the system described herein. The VM may be moved from any one of the storage devices ($SD_1$-$SD_N$) 24a-c, described above, to any other one of the storage devices ($SD_1$-$SD_N$) 24a-c. It is also possible for the VM to execute on a different one of the hosts ($H_1$-$H_N$) 22a-c, described above, in connection with being moved. The processing illustrated by the flow diagram 100 may be performed by whichever one of the hosts ($H_1$-$H_N$) 22a-c is handling moving the VM. The VM may access data on one or more of the storage devices ($SD_1$-$SD_N$) 24a-c using the VVol mechanism, although the invention is not so limited and the system described herein may operate with VMs that access data on the storage devices ($SD_1$-$SD_N$) 24a-c using any appropriate data access mechanism.

Processing for the flow diagram 100 begins at a first test step 102 where it is determined if a built-in data copying mechanism already exists for offloading data copying from the host so that the storage devices handle the data copying. For example, in the case of moving a VMWare VM using VVols on two Dell EMC PowerMax storage arrays, a built-in mechanism exists for offloading data copying from the host to the storage devices. If it is determined at the step 102 that a built-in mechanism for offloading data copying exists, then control transfers from the test step 102 to a step 104 where the built-in data copying mechanism is initiated. Otherwise, if it is determined at the test step 102 that there is no built-in data copying mechanism, then control transfers from the test step 102 to a test step 106 where it is determined if the source storage device for the VM transfer (the one of the storage devices ($SD_1$-$SD_N$) 24a-c from which the VM is being moved) is capable of providing Open Replicator (OR) functionality, or similar. Open Replicator is a software package from Dell EMC that allows direct copying from one storage device to another. In addition, Open Replicator only requires one of the storage devices to have OR capabilities; OR on one of the storage devices accesses data on the other storage device using conventional I/O operations. Thus, a single storage device having OR capabilities can transfer data directly to or from an other storage device where the other storage device does not have any particular capabilities except servicing read and write requests. Note that the system described herein may use software other than Open Replicator so long as the software provides the functionality described herein.

If it is determined at the test step 106 that the source storage device has OR capabilities (or similar), then control transfers from the test step 106 to a step 108 where the source storage device is configured to push the data for the VM from the source storage device to a destination storage device (the one of the storage devices ($SD_1$-$SD_N$) 24a-c to which the VM is being moved). In this case, the destination storage device may be a third party storage device that services I/O operations in response to requests from the source storage device running OR, or similar. If it is determined at the test step 106 that the source storage device does not have OR capabilities (or similar), then control transfers from the test step 106 to a test step 112 where it is determined if the destination storage device has OR capabilities (or similar). If not, then control transfers from the test step 112 to a step 114 where the host is used to copy the data from the source storage device to the destination storage device. The step 114 is reached if neither the source storage device nor the destination storage device has OR capabilities, or similar. Note that the host may be the same host that rubs the VM being transferred or may be a different host.

If it is determined at the test step 112 that the destination storage device has OR capabilities, then control transfers from the test step 112 to a step 116 where the destination storage device is configured to pull the data for the VM from the source storage device. In this case, the source storage device may be a third party storage device that services I/O operations in response to requests from the destination storage device running OR. Following the step 116 is a step 118 where the host waits for all of the data to be copied. The step 118 is also reached following the step 104, discussed above, or following the step 108, discussed above. Note that, while the host is waiting for the storage devices to complete the data transfer at the step 118, the host can perform other, unrelated, processing, such as servicing other VMs on the host, because the host is not being used to transfer data. Following the step 118 is a step 122 where the host finishes transferring the VM by, for example, deleting the VM data at the source storage device. Note that the step 122 is reached independently from the step 114, described above, where the host handles copying the data. Following the step 122, processing is complete.

Referring to FIG. 6, a flow diagram 150 illustrates processing performed in connection with initializing the storage devices for the data transfer mechanism described herein. In order to use Open Replicator (or similar), a storage device needs to have an inventory of available volumes on a target storage device. Note that the target storage device in an Open Replicator session could be either a source storage device or a destination storage device with respect to transferring a VM. Processing for the flow diagram 150 begins at a first step 152 where the storage device having open replicator capabilities discovers the other storage devices in the system using, for example, the SAN 60 and conventional mechanisms for discovering devices in a SAN. Following the step 152 is a step 154 where, for each of the devices that are discovered at the step 152, the storage device determines all of the logical volumes, including volumes associated with VVols on each of the storage devices. Following the step 154, processing is complete.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transferring data for a virtual machine from a source storage device to a destination storage device via a storage area network, comprising:
    determining if the source storage device and the destination storage device have a built-in copy mechanism that causes the source storage device and the destination storage device to directly transfers data for virtual volumes;
    initiating the built-in copy mechanism at the source storage device and at the destination storage device to cause data for the virtual volumes to be transferred from the source storage device to the destination storage device if it is determined that the source storage device and the destination storage device each have a built-in copy mechanism;
    determining if either the source storage device or the destination storage device is capable of unilaterally transferring data for the virtual volumes directly to or from an other storage device if it is determined that the source storage device and the destination storage device do not have a built-in copy mechanism;
    the source storage device using the storage area network to discover virtual volumes that are used by the virtual machine on the destination storage device and pushing data for the virtual volumes to the destination storage device in response to the source storage device being capable of unilaterally transferring data for the virtual volumes directly to the destination storage device and the source storage device and the destination storage device not having a built-in copy mechanism;
    the destination storage device using the storage area network to discover virtual volumes that are used by the virtual machine on the source storage device and pulling data for the virtual volumes from the source storage device in response to the destination storage device being capable of unilaterally transferring data for the virtual volumes directly from the source storage device and the source storage device and the destination storage device not having a built-in copy mechanism; and
    a host computing device, coupled to the source storage device and the destination storage device, transferring data for the virtual volumes from the source storage device to the destination storage device only in response to neither the source storage device nor the destination storage device being capable of unilaterally transferring data for the virtual volumes and the source storage device and the destination storage device not having a built-in copy mechanism.

2. A method, according to claim 1, wherein at least one of the source storage device or the destination storage device runs open replicator software.

3. A method, according to claim 1, wherein the host is the same host that runs the virtual machine being transferred.

4. A method, according to claim 1, wherein a first host runs the virtual machine at the source storage device and a second, different, host runs the virtual machine at the destination storage device.

5. A method, according to claim 1 wherein the host is coupled to the storage area network.

6. A method, according to claim 1, wherein the virtual machine accesses the source storage device and the destination storage device using a VVol mechanism.

7. A method, according to claim 6, wherein at least one of the source storage device and the destination storage device does not use built-in VVol data copying to offload data copying operations to the source storage device and the destination storage device.

8. A method, according to claim 1, wherein the host performs unrelated processing while data for the virtual volumes is being copied from the source storage device to the destination storage device.

9. A method, according to claim 8, wherein the unrelated processing includes processing for other virtual machines.

10. A non-transitory computer readable medium containing software that transfers data for a virtual machine from a source storage device to a destination storage device via a storage area network, the software comprising:
    executable code that determines if the source storage device and the destination storage device have a built-in copy mechanism that causes the source storage device and the destination storage device to directly transfers data for virtual volumes;
    executable code that initiates the built-in copy mechanism at the source storage device and at the destination storage device to cause data for the virtual volumes to be transferred from the source storage device to the destination storage device if it is determined that the source storage device and the destination storage device each have a built-in copy mechanism;
    executable code that determines if either the source storage device or the destination storage device is capable of unilaterally transferring data for the virtual volumes directly to or from an other storage device if it is determined that the source storage device and the destination storage device do not have a built-in copy mechanism;
    executable code that causes the source storage device to use the storage area network to discover virtual volumes that are used by the virtual machine on the destination storage device and to push data for the virtual volumes to the destination storage device in response to the source storage device being capable of unilaterally transferring data for the virtual volumes directly to the destination storage device and the source storage device and the destination storage device not having a built-in copy mechanism;
    executable code that causes the destination storage device to use the storage area network to discover virtual volumes that are used by the virtual machine on the source storage device and to pull data for the virtual volumes from the source storage device in response to the destination storage device being capable of unilaterally transferring data for the virtual volumes directly from the source storage device and the source storage device and the destination storage device not having a built-in copy mechanism; and
    executable code that causes a host computing device, coupled to the source storage device and the destination storage device, to transfer data for the virtual volumes from the source storage device to the destination storage device only in response to neither the source storage device nor the destination storage device being capable of unilaterally transferring data to a storage device for the virtual volumes and the source storage device and the destination storage device not having a built-in copy mechanism.

11. A non-transitory computer readable medium, according to claim 10, wherein at least one of the source storage device or the destination storage device runs open replicator software.

12. A non-transitory computer readable medium, according to claim 10, wherein the host is the same host that runs the virtual machine being transferred.

13. A non-transitory computer readable medium, according to claim 10, wherein a first host runs the virtual machine at the source storage device and a second, different, host runs the virtual machine at the destination storage device.

14. A non-transitory computer readable medium, according to claim 1, wherein the host is coupled to the storage area network.

15. A non-transitory computer readable medium, according to claim 10, wherein at least one of the source storage device and the destination storage device does not use built-in VVol data copying to offload data copying operations to the source storage device and the destination storage device.

16. A non-transitory computer readable medium, according to claim 15, wherein at least one of the devices is incapable of using native built-in VVol data copying to offload data copying operations to the storage devices.

17. A non-transitory computer readable medium, according to claim 10, wherein the host performs unrelated processing while data for the virtual volumes is being copied from the source storage device to the destination storage device.

18. A non-transitory computer readable medium, according to claim 17, wherein the unrelated processing includes processing for other virtual machines.

* * * * *